United States Patent
Rao et al.

(10) Patent No.: US 10,425,288 B2
(45) Date of Patent: Sep. 24, 2019

(54) CONTAINER TELEMETRY IN DATA CENTER ENVIRONMENTS WITH BLADE SERVERS AND SWITCHES

(71) Applicant: Cisco Technology, Inc., San Jose, CA (US)

(72) Inventors: Patnala Debashis Rao, Cupertino, CA (US); Huilong Huang, Milpitas, CA (US); Deepak Raykar, Sunnyvale, CA (US); Shyam Kapadia, San Jose, CA (US); Stephanie Wong, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 101 days.

(21) Appl. No.: 15/656,381

(22) Filed: Jul. 21, 2017

(65) Prior Publication Data
US 2019/0028352 A1    Jan. 24, 2019

(51) Int. Cl.
*H04L 12/24* (2006.01)
*H04L 12/44* (2006.01)

(52) U.S. Cl.
CPC ............ *H04L 41/12* (2013.01); *H04L 12/44* (2013.01); *H04L 41/22* (2013.01)

(58) Field of Classification Search
None
See application file for complete search history.

(56) References Cited

U.S. PATENT DOCUMENTS

| | | |
|---|---|---|
| 5,812,773 A | 9/1998 | Norin |
| 5,889,896 A | 3/1999 | Meshinsky et al. |
| 6,108,782 A | 8/2000 | Fletcher et al. |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Amedro, Brian, et al., "An Efficient Framework for Running Applications on Clusters, Grids and Cloud," 2010, 17 pages.

(Continued)

*Primary Examiner* — Ajit Patel
(74) *Attorney, Agent, or Firm* — Polsinelli PC

(57) ABSTRACT

The present disclosure provides systems, methods, and non-transitory computer-readable storage media for determining container to leaf switch connectivity information in a data center in a presence of blade switches and servers. In one aspect of the present disclosure, a method of determining container to leaf switch connectivity information of a data center utilizing at least one blade switch and at least one blade server, includes receiving, at a network controller, link connectivity information that includes south-bound neighboring information between the at least one blade switch of the data center and the at least one blade server of the data center; determining, at the network controller, the container to leaf switch connectivity information of the data center, based on the link connectivity information; and generating a visual representation of a topology of the data center based on the container to leaf switch connectivity information.

20 Claims, 5 Drawing Sheets

(56) References Cited

U.S. PATENT DOCUMENTS

| | | |
|---|---|---|
| 6,178,453 B1 | 1/2001 | Mattaway et al. |
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Iyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,583,665 B1 | 9/2009 | Duncan et al. |
| 7,606,147 B2 | 10/2009 | Luft et al. |
| 7,644,437 B2 | 1/2010 | Volpano |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,160,063 B2 | 4/2012 | Maltz et al. |
| 8,171,415 B2 | 5/2012 | Appleyard et al. |
| 8,194,534 B2 | 6/2012 | Pandey et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,495,725 B2 | 7/2013 | Ahn |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,607,225 B2 | 12/2013 | Stevens |
| 8,611,356 B2 | 12/2013 | Yu et al. |
| 8,612,625 B2 | 12/2013 | Andries et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,128,631 B2 | 9/2015 | Myrah et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,361,192 B2 | 6/2016 | Smith et al. |
| 9,379,982 B1 | 6/2016 | Krishna et al. |
| 9,380,075 B2 | 6/2016 | He et al. |
| 9,430,262 B1* | 8/2016 | Felstaine ............ G06F 9/45558 |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 10,171,309 B1* | 1/2019 | Smith ..................... H04L 41/12 |
| 2001/0055303 A1 | 12/2001 | Horton et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0062187 A1 | 3/2006 | Rune |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |

(56) References Cited

U.S. PATENT DOCUMENTS

| | | |
|---|---|---|
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |

(56) References Cited

U.S. PATENT DOCUMENTS

| | | |
|---|---|---|
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorenson, III et al. |
| 2014/0310417 A1 | 10/2014 | Sorenson, III et al. |
| 2014/0310418 A1 | 10/2014 | Sorenson, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0334488 A1 | 11/2014 | Guichard et al. |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0074246 A1* | 3/2015 | Premji ............... H04L 41/0886 709/220 |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0178133 A1 | 6/2015 | Phelan et al. |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0330080 A1* | 11/2016 | Bhatia ............... H04L 41/12 |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0048100 A1* | 2/2017 | Delinocci ............ H04L 41/065 |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0149878 A1 | 5/2017 | Mutnuru |
| 2017/0163531 A1 | 6/2017 | Kumar et al. |
| 2017/0171158 A1 | 6/2017 | Hoy et al. |
| 2017/0264663 A1 | 9/2017 | Bicket et al. |
| 2017/0339070 A1 | 11/2017 | Chang et al. |
| 2017/0358111 A1* | 12/2017 | Madsen ............ H04L 41/0893 |
| 2018/0006894 A1* | 1/2018 | Power ................ H04L 41/12 |
| 2018/0034747 A1* | 2/2018 | Nataraja ............. H04L 49/70 |
| 2018/0062930 A1* | 3/2018 | Dhesikan ........... H04L 41/0896 |
| 2018/0063025 A1* | 3/2018 | Nambiar ............ H04L 47/82 |
| 2018/0359171 A1* | 12/2018 | Kommula ........... H04L 45/02 |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |
| WO | 2016146011 | 9/2016 |

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

(56) References Cited

OTHER PUBLICATIONS

Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.
Beyer, Steffen, "Module "Data::Locations?!"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.

Fang K., "LISP MAC-EID-TO-RLOC Mapping (LISP based L2VPN)," Network Working Group, Internet Draft, Cisco Systems, Jan. 2012, 12 pages.
Ford, Bryan, et al., Peer-to-Peer Communication Across Network Address Translators, In USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kumar, S., et al., "Infrastructure Service Forwarding for NSH," Service Function Chaining Internet Draft, draft-kumar-sfc-nsh-forwarding-00, Dec. 5, 2015, 10 pages.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Meraki, "meraki releases industry's first cloud-managed routers," Jan. 13, 2011, 2 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud www.flexiant.com. Bursting, Brokerage and Aggregation," 2012, 8 pages.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Quinn, P., et al., "Network Service Header," Internet Engineering Task Force Draft, Jul. 3, 2014, 27 pages.
Quinn, P., et al., "Service Function Chaining (SFC) Architecture," Network Working Group, Internet Draft, draft-quinn-sfc-arch-03.txt, Jan. 22, 2014, 21 pages.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.

(56) References Cited

OTHER PUBLICATIONS

Son, Jungmin, "Automatic decision system for efficient resource selection and allocation in inter-clouds," Jun. 2013, 35 pages.

Sun, Aobing, et al., "IaaS Public Cloud Computing Platform Scheduling Model and Optimization Analysis," Int. J. Communications, Network and System Sciences, 2011, 4, 803-811, 9 pages.

Szymaniak, Michal, et al., "Latency-Driven Replica Placement", vol. 47 No. 8, IPSJ Journal, Aug. 2006, 12 pages.

Toews, Everett, "Introduction to Apache jclouds," Apr. 7, 2014, 23 pages.

Von Laszewski, Gregor, et al., "Design of a Dynamic Provisioning System for a Federated Cloud and Bare-metal Environment," 2012, 8 pages.

Wikipedia, "Filter (software)", Wikipedia, Feb. 8, 2014, 2 pages, https://en.wikipedia.org/w/index.php?title=Filter_%28software%29&oldid=594544359.

Wikipedia; "Pipeline (Unix)", Wikipedia, May 4, 2014, 4 pages, https://en.wikipedia.org/w/index.php?title=Pipeline2/028Unix%29&oldid=606980114.

Ye, Xianglong, et al., "A Novel Blocks Placement Strategy for Hadoop," 2012 IEEE/ACTS 11th International Conference on Computer and Information Science, 2012 IEEE, 5 pages.

\* cited by examiner

CONTAINER TELEMETRY IN DATA CENTER ENVIRONMENTS WITH BLADE SERVERS AND SWITCHES

TECHNICAL FIELD

The present technology pertains to operations and management of a data center environment, which utilizes blade switches and blade servers on which containers providing microservices are deployed.

BACKGROUND

Microservices and containers have been gaining traction in the new age of application development coupled with, for example, container integration (CI)/continuous deployment (CD) model. One prevalent example standard of this system is provided by Docker. Containers have introduced new challenges to data centers in areas of provisioning, monitoring, manageability and scale. Monitoring and analytics tools are key asks from IT and data center operators to help the operators understand the network usage especially with the set of hybrid workloads present within a data center.

Typically, orchestration tools (e.g., Kubernetes, Swarm, Mesos etc.) are used for deploying containers. On the other hand, discovering and visualizing the container workloads on the servers is achieved by (1) listening to container events (start, stop etc.) from the container orchestrators along with associated metadata as to what container is running what application, the IP, the MAC, the image etc. and (2) gleaning physical connectivity via link discovery protocols (e.g., link layer discovery protocol (LLDP)/Cisco discovery protocol (CDP)) from the server and leaf (top of the rack (ToR)) switches. A Data Center controller like Data Center Network Manager (DCNM) already has the Data Center (DC) fabric topology information and therefore, visualizing the container workloads is a matter of correlating the connectivity information with the physical topology.

However, the above discovery and visualization process is inadequate in case of deployment of blade switches within a DC that sits between a blade server and leaf switches or ToRs. This is due to the fact that a blade switch consumes the LLDP/CDP frames and thus the connectivity information of a blade server (and consequently containers running on such blade server) to a network leaf will become invisible and cannot be gleaned easily. Therefore, it is not possible to determine information about container deployments across blade servers within a data center environment that connect to leaf switches within a fabric of a data center via one or more blade switches.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to lac considered to be limiting of its scope, the principles herein are described and explained with additional specificity and detail through the use of the accompanying drawings in which.

DETAILED DESCRIPTION

Overview

Figure 1:
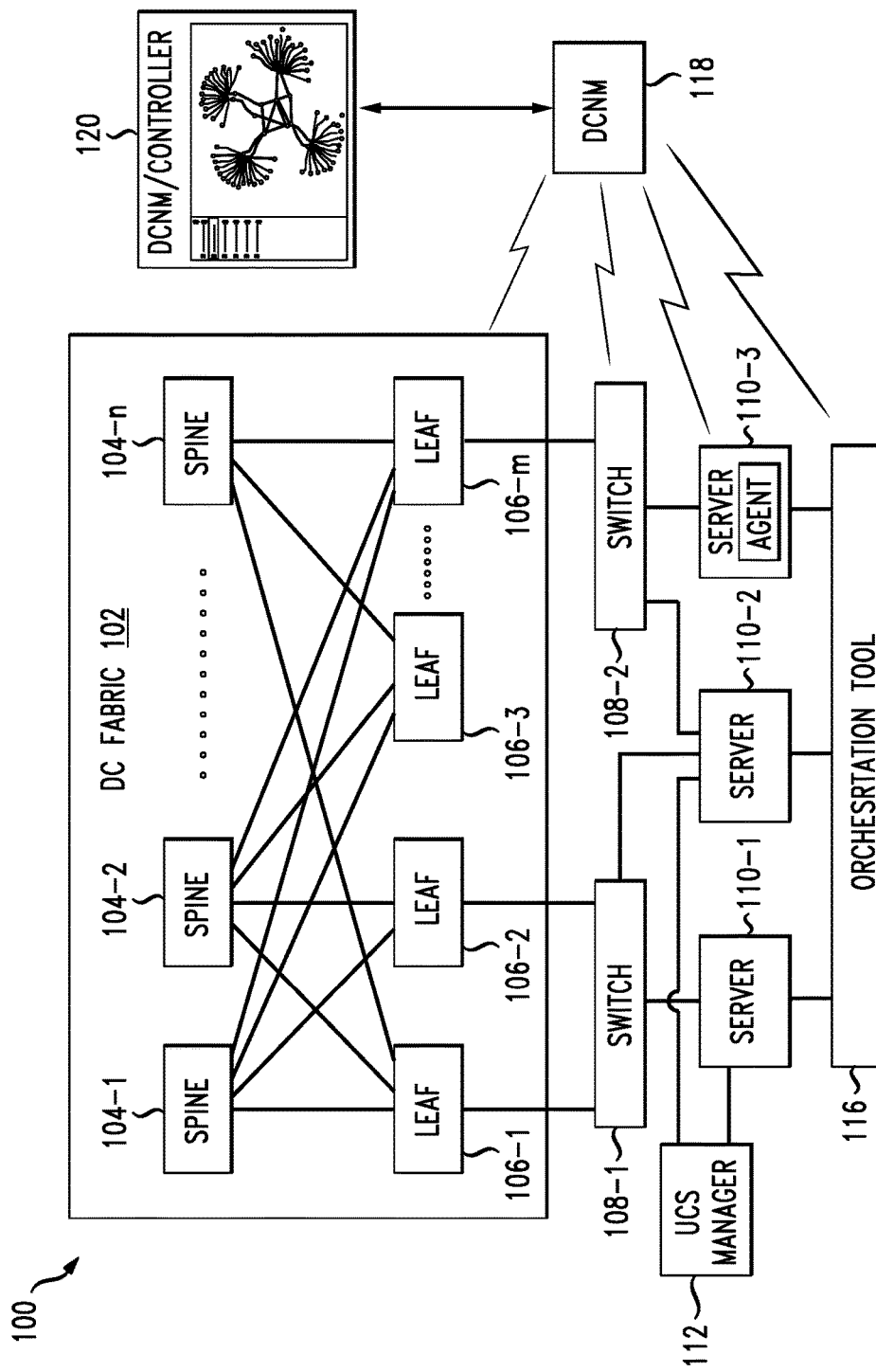
FIG. 1 illustrates a data center structure, according to an aspect of the present disclosure.

In one aspect of the present disclosure, a method of determining container to leaf switch connectivity information of a data center utilizing at least one blade switch and at least one blade server, includes receiving, at a network controller, link connectivity information that includes south-bound neighboring information between the at least one blade switch of the data center and the at least one blade server of the data center; determining, at the network controller, the container to leaf switch connectivity information of the data center, based on the link connectivity information; and generating a visual representation of a topology of the data center based on the container to leaf switch connectivity information.

In one aspect of the present disclosure, a data center includes at least one blade switch; at least one blade server; and at least one network controller configured to receive link connectivity information that includes south-bound neighboring information between the at least one blade switch of the data center and the at least one blade server of the data center; determine container to leaf switch connectivity information of the data center, based on the link connectivity information; and generate a visual representation of a topology of the data center based on the container to leaf switch connectivity information.

In one aspect of the present disclosure, a non-transitory computer-readable medium has computer-readable instruction stored therein, which when executed by a processor, causes the processor to determine container to leaf switch connectivity information of a data center utilizing at least one blade switch and at least one blade server, by receiving link connectivity information that includes south-bound neighboring information between the at least one blade switch of the data center and the at least one blade server of the data center; determining, at the network controller, the container to leaf switch connectivity information of the data center, based on the link connectivity information; and generating a visual representation of a topology of the data center based on the container to leaf switch connectivity information.

Description

Various examples of the disclosure are discussed in detail below. While specific implementations are discussed, it should be understood that this is done for illustration purposes only. A person skilled in the relevant art will recognize that other components and configurations may be used without parting from the spirit and scope of the disclosure.

References to one or an example embodiment in the present disclosure can be, but not necessarily are, references to the same example embodiment; and, such references mean at least one of the example embodiments.

Reference to "one example embodiment" or "an example embodiment" means that a particular feature, structure, or characteristic described in connection with the example embodiment is included in at least one example of the disclosure. The appearances of the phrase "in one example embodiment" in various places in the specification are not necessarily all referring to the same example embodiment, nor are separate or alternative example embodiments mutually exclusive of other example embodiments. Moreover, various features are described which may be exhibited by some example embodiments and not by others. Similarly, various features are described which may be features for some example embodiments but not other example embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to limit the scope of the disclosure, examples of instruments, apparatus, methods and their related results according to examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular examples only and is not intended to be limiting. As used herein, the singular forms "a", "an", and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures and techniques may be shown without unnecessary detail in order to avoid obscuring examples.

In the following description, illustrative examples will be described with reference to acts and symbolic representations of operations in the form of flow charts, flow diagrams, data flow diagrams, structure diagrams, block diagrams, etc.) that may be implemented as program services or functional processes include routines, programs, objects, components, data structures, etc., that perform particular tasks or implement particular abstract data types and may be implemented using hardware at network elements. Non-limiting examples of such hardware may include one or more Central Processing Units (CPUs), digital signal processors (DSPs), application-specific-integrated-circuits, field programmable gate arrays (FPGAs), computers or the like.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A data center (DC) is an example of a cloud computing environment that can provide computing services to customers and users using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), containers, etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, containers that provide microservices, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

FIG. 1 illustrates a data center structure, according to an aspect of the present disclosure. DC 100 shown in FIG. 1 includes a data center fabric 102. As can be seen, the data center fabric 102 can include spine switches 104-1, 104-2, . . . , 104-n (Collectively referred to as spine switches 104, with n being a positive integer greater than 2) connected to leaf switches 106-1, 106-2, 106-3, . . . , 106-m (Collectively referred to as leaf switches 106 with n being a positive integer greater than 2 that may or may not have the same value as 'n'). The number of spine switches 104 and leaf switches 106 are not limited to that shown in FIG. 1 and may be more or less than shown (e.g., at least one spine switch 104 or more and at least one or more leaf switch 106). Any one of spine switches 104 can be connected to one or more or all of leaf switches 106. However, interconnectivity of spine switches 104 and leaf switches 106 are not limited to that shown in FIG. 1.

Spine switches 104 can be L3 switches in the data center fabric 102. However, in some cases, the spine switches 104 can also, or otherwise, perform L2 functionalities. Further, the spine switches 104 can support various capabilities, such as 40 or 10 Gbps Ethernet speeds. To this end, the spine switches 104 can include one or more 40 Gigabit Ethernet ports. Each port can also be split to support other speeds. For example, a 40 Gigabit Ethernet port can be split into four 10 Gigabit Ethernet ports. Functionalities of spine switches 104 are not limited to that described above but may include any other known, or to be developed, functionality as known to those skilled in the art.

Spine switches 104 connect to leaf switches 106 in the data center fabric 102. Leaf switches 104 can include access ports or non-fabric ports) and fabric ports. Fabric ports can provide uplinks to the spine switches 104, while access ports can provide connectivity for devices, hosts, endpoints, VMs, switches, servers running containers or external networks to the data center fabric 102.

Leaf switches 106 can reside at the edge of the data center fabric 102, and can thus represent the physical network edge. In some cases, the leaf switches 106 can be top-of-rack ("ToR") switches configured according to a ToR architecture. In other cases, the leaf switches 104 can be aggregation switches in any particular topology, such as end-of-row (EoR) or middle-of-row (MoR) topologies. The leaf switches 106 can also represent aggregation switches, for example.

Leaf switches 104 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Network connectivity in data center fabric 102 can flow through leaf switches 106. Here, leaf switches 106 can provide servers, resources, endpoints, external networks, switches or VMs access to data center fabric 102, and can connect leaf switches 106 to each other. In some cases, leaf switches 102 can connect Endpoint Groups (EPGs) to data center fabric 102 and/or any external networks. Each EPG can connect to data center fabric 102 via one of the leaf switches 106, for example.

DC 100 further includes one or more blade switches 108-1 and 108-2 (collectively referred to as blade switches 108 or switches 108). Blade switches 108 may be any known or to be developed blade switch such as various types of Fabric Interconnect (FI) blade switches designed and manufactured by Cisco Technology Inc., of San Jose, Calif. Alternatively, one or more of blade switches 108 may be any other known, or to be developed, blade switches that are available through any other switch/server and data center components manufacturer. Number of blade switches 108 is not limited to that shown in FIG. 1 but can be one or more.

Each of blade switches 108 can be connected to one or more of leaf switches 106.

DC 100 further includes one or more servers 110-1, 110-2 and 110-3 (collectively referred to as servers 110). Servers 110 can be any type of known or to be developed server including, but not limited to, known or to be developed blade servers. Servers 110 can be Uniform Computing System (UCS) blade servers designed and manufactured by Cisco Technology Inc., of San Jose, Calif. Alternatively, servers 110 can be any known, or to be developed, non-UCS blade servers available through any other switch/server and data center components manufacturer. The number of servers 110 is not limited to that shown in FIG. 1 and may be one or more servers.

In one example, one or more of the servers 110 may be a non-blade server that can be directly connected to one or more of leaf switches 106 without first being connected to an intermediary switch such as one of blade switches 108.

Each blade switch 108 can include a north-bound interface and south-bound interface that identify north-bound and south-bound neighbors of switch 108. In example of FIG. 1, northbound neighbors of each of blade switches 108 can be any one or more leaf switches 106 while southbound neighbors of blade switch 108 can be any one or more servers 110 connected thereto.

Each one of blade servers 110 can be connected to one or more of blade switches 108 and/or, as described above, be directly connected to one or more of leaf switches 106.

Each of servers 110 may host one or more containers. Containers hosted by each of the servers 110 may be any know or to be developed container available and known to those skilled in the art. Furthermore, while reference is being made throughout this disclosure to containers and container workloads hosted by servers 110, servers 110 are not limited to hosting containers hut can execute any other mechanism a virtual machine) for providing virtual access to applications available thereon for consumers and customers. In one example, a given microservice (e.g., an application) can be provided via a single container or can span multiple containers that can be hosted on a single one of servers 110 or two or more of servers 110.

In one example, DC 100 includes a UCS manager 112 connected to each of servers 110 that is a blade server designed and manufactured by Cisco Technology Inc., of San Jose, Calif. (e.g., blade servers 110-1 and 110-2 shown in FIG. 1). In one example, one or more blade switches 108 utilized in conjunction with servers 110 are also designed and manufactured by Cisco Technology Inc., of San Jose, Calif. In this case, UCS manager 112 may be a separate physical component having hardware (e.g., a processor and a memory) and computer-readable instructions stored on the memory, which when executed by the processor configures the processor to perform functions related to collecting and determining link connectivity information of blade switch 108 (e.g., north-bound and/or south-band neighbor information of blade switch 108). UCS manager 112 and its corresponding functionalities will be further described with reference to FIGS. 3 and 4.

In one example, DC 100 includes agent 114 deployed within each of servers 110 that is a non-UCS server designed and manufactured by manufacturers other than Cisco Technology, Inc. of San Jose, Calif. (e.g., blade server 110-3 shown in FIG. 1). In one example, one or more blade switches 108 utilized in conjunction with servers 110 are also designed and manufactured by manufacturers other than Cisco Technology Inc., of San Jose, Calif. Agents 114, as will be described below, is software running on corresponding ones of servers 110 that can periodically collect neighboring server information for containers on each such blade server, as will be further described below with reference to FIGS. 5 and 6.

In one example and as shown in FIG. 1, servers 110 can be a combination of blade servers designed and manufactured by Cisco Technology, Inc. of San Jose, Calif. (e.g., blade servers 110-1 and 110-2) and blade servers designed and manufactured by manufacturers other than Cisco Technology, Inc. of San Jose, Calif. (e.g., blade server 110-3). DC 100 can include a combination of UCS manager 112 and one or more agents 114.

In another example, blade servers 110 of DC 100 are homogenous meaning that either all of blade servers 110 are designed and manufactured by Cisco Technology, Inc. of San Jose, Calif. (in which case, DC 100 does not include any agent 114) or all of blade servers are designed and manufactured by manufacturers other than Cisco Technology, Inc. of San Jose, Calif. (in which case, DC 100 does not include UCS manager 112).

DC 100 further includes an orchestration tool 116. Orchestration tool 116 may be any know or to be developed orchestration tool connected to servers 110 that among other functionalities, can be used to deploy containers on servers 110.

DC 100 also includes a data center network manager (DCNM)) 118. DCNM 118 can also be referred to as controller 118. DCNM 118 can be a separate hardware (a processor and a memory) running computer-readable instructions that transform the processor into a special purpose processor for running, network management functionalities, which include, but is not limited to, providing an overview of DC 100 for operators (for purposes of provisioning, monitoring, and managing DC 100, understanding network usage, etc.). FIG. 1 illustrates an example of a visual illustration 120 of DC 100 provided by DCNM 118. DCNM 118 can communicate with various components of DC 100 via any known, or to be developed, wired and/or wireless communication means, protocols, etc., as shown in FIG. 1.

Figure 2:
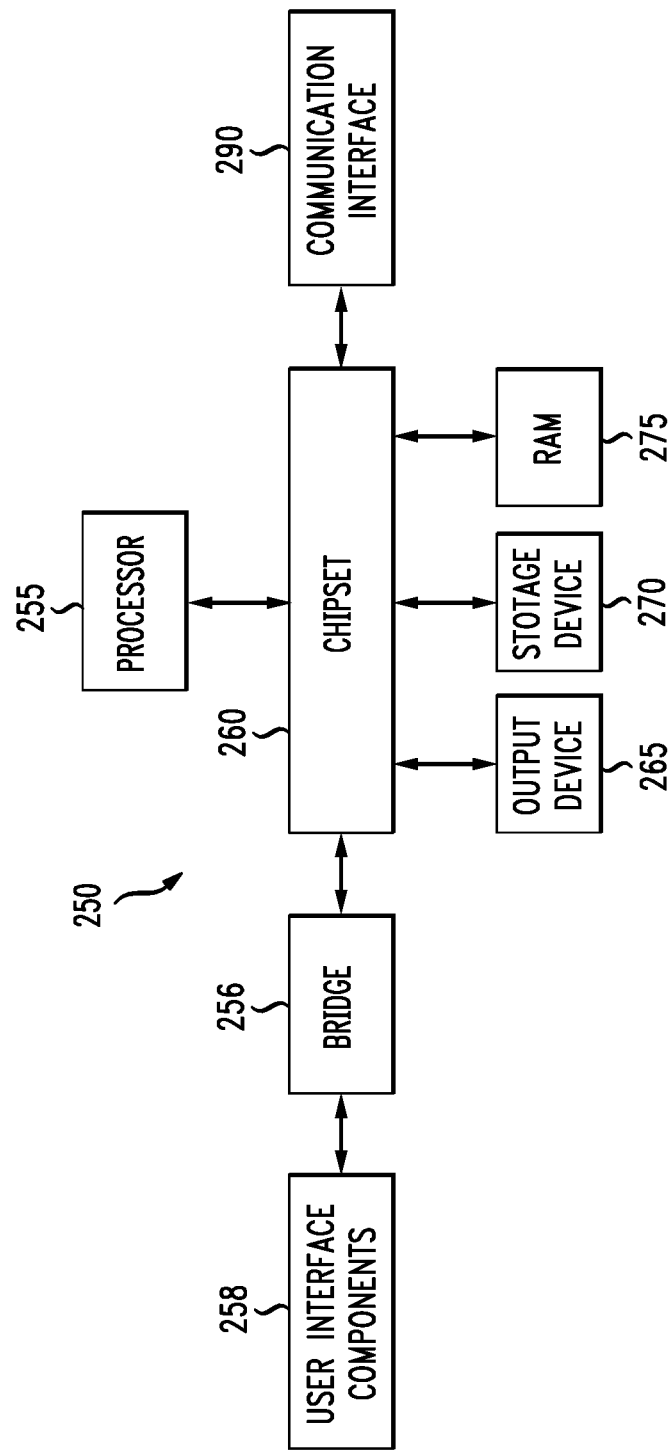
FIG. 2 illustrates components of a network device, according to an aspect of the present disclosure.

FIG. 2 illustrates components of a network device, according to an aspect of the present disclosure. Network device 250 shown in FIG. 2 can be DCNM 118. UCS manager 112 and/or agent 114 described above with reference to FIG. 1. Network device 250 includes a chipset architecture that can be used in executing the described method and generating and displaying a graphical user interface (GUI) (e.g., visual illustration 120 of FIG. 1). Network device 250 is an example of computer hardware, software, and firmware that can be used to implement the disclosed technology. Network device 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to Network device 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that Network device 250 can have more than one processor 210 or be part of a group or cluster of computing devices networked together to provide greater processing capability.

Alternatively, Network device 250 can be implemented on one of servers 110 shown in FIG. 1 instead of having a separate dedicated hardware structure as described with reference to FIG. 2.

Figure 3:
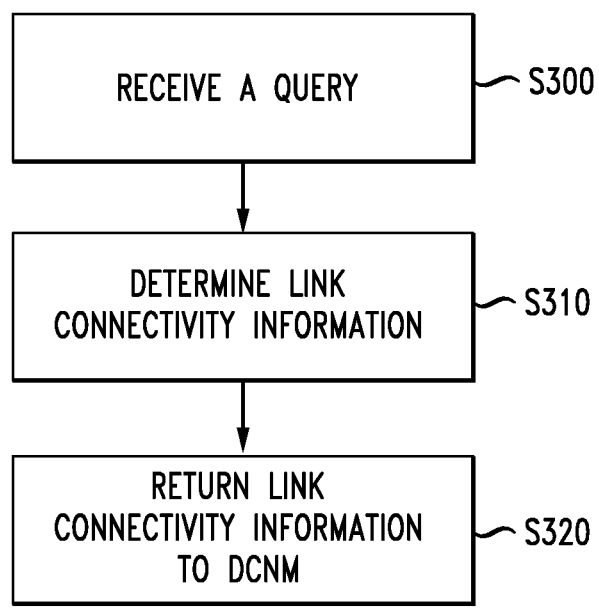
FIG. 3 illustrates a method according to an aspect of the present disclosure.

FIG. 3 illustrates a method according to an aspect of the present disclosure. FIG. 3 will be described from the perspective of UCS manager 112 when one or more of servers (blade servers) 110 and switch (blade switch) 1.08 is a blade switch manufactured by Cisco Technology, Inc. of San Jose, Calif.

At S300, UCS manager 112 (via a corresponding processor such as processor 255) receives a query from DCNM 118. The query can be communicated to UCS manager 112 by DCNM 118 through any known or to be developed wired and/or wireless communication means. In one example, the query is for link connectivity information. In one example, link connectivity information includes information about connectivity of UCS blade server(s) 110 and blade switch(es) 108 (one or more FI 108). This connectivity information about the UCS blade server(s) and each blade switch 108 may be referred to as south-bound neighboring information of a corresponding blade switch 108.

In one example, in addition to the south-bound neighboring information described above, link connectivity information also includes information about connectivity of each blade switch 108 to one or more of leaf switches 106. This connectivity information about each blade switch 108 and the one or more leaf switches 106 may be referred to as north-bound neighboring information of a corresponding blade switch 108.

In other words, link connectivity information includes information related to which blade server(s) 110 are connected to which blade switch 108 and which leaf switches 106 are connected to which blade switch 108.

At S310, UCS manager 112 determines link connectivity information. In one example, UCS manager 112 determines link connectivity information by determining LLDP and/or CDP neighbor information of each blade switch 108 obtained from inspecting LLDP/CDP frames. By inspecting LLDP/CDP frames between each blade switch 108 and one or more leaf switches 106. UCS manager 112 determines which leaf switches are connected to which blade switch 108.

Similarly, by inspecting LLDP/CDP frames between each blade server 110 and each blade switch 108. UCS manager 112 determines which blade server(s) 110 are connected to which blade switch 108.

In one example, UCS manager 112 performs the above process S310 for every blade switch 108 available and operating within DC 100.

At S320, UCS manager 112 returns (sends) the link connectivity information as determined at S310 to DCNM 118. UCS manager 112 can send the link connectivity information to DCNM 118 through any known or to be developed wired and/or wireless communication means.

Figure 4:
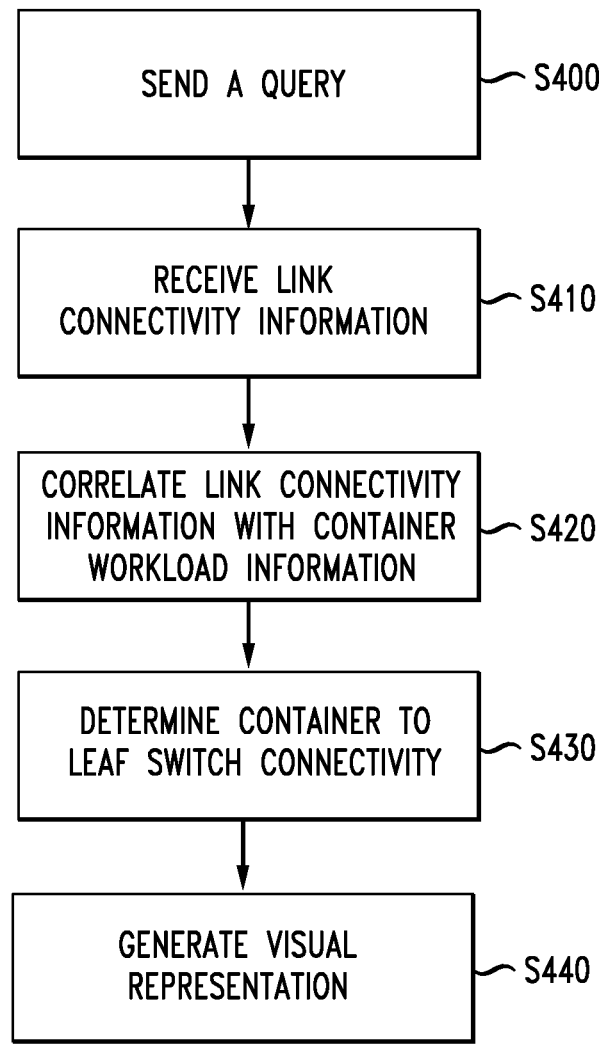
FIG. 4 illustrates a method according to an aspect of the present disclosure.

FIG. 4 illustrates a method, according to an aspect of the present disclosure. FIG. 4 will be described from the perspective of DCNM 118.

At S400, DCNM 118 (via a corresponding processor such as processor 255) sends a query (e.g., a query for link connectivity information) to UCS manager 112 (network component), as described above with reference to FIG. 3. The query can be communicated to UCS manager 112 by DCNM 118 through any known or to be developed wired and/or wireless communication means.

At S410 DCNM 118 receives link connectivity information determined and sent by UCS manager 112 (as described above with reference to S310 and S320 of FIG. 3).

At S420, DCNM 118 correlates the received linked connectivity information with container workload information available to DCNM 118. Container workload information includes information indicating which containers are running on which each blade server 110. In one example, DCNM 118 receives notifications (which may or may not be periodic) from orchestration tool 116. Such notifications include information on changes to container(s) state (start, stop etc.) and the server(s) (e.g., server ID) on which each container is hosted.

At S430 and based on the correlation at S420, DCNM 118 determines which containers are connected to which one of leaf switches 106. This may be referred to as container to leaf switch connectivity information.

At S440 and based on the determined information at S430, DCNM 118 generates visual representation 120 of a topology of the DC 100, that also illustrates the container to leaf switch connectivity information between container workloads and their connectivity to each of leaf switches 106 thus providing, a more complete and holistic view of DC 100 connectivity and operations.

Figure 5:
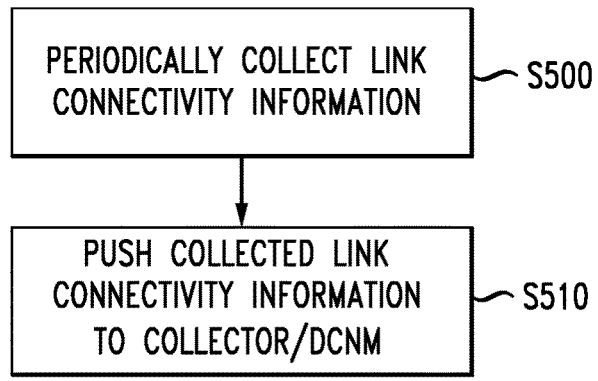
FIG. 5 illustrates a method according to an aspect of the present disclosure.

FIG. 5 illustrates a method according to an aspect of the present disclosure. FIG. 5 will be described from the perspective of one of more of agents 114 described above with reference to FIG. 1. FIG. 5 corresponds to examples in which one or more of servers (blade servers) 110 and switch (blade switch) 108 are manufactured by a manufacturer other than Cisco Technology, Inc. of San Jose, Calif.

As indicated above for each blade server on which containers are running, that is not manufactured by Cisco Technology Inc., of San Jose, Calif., an agent 114 (e.g., Cisco Container Telemetry Agent) is running thereon. FIG. 5 will now be described from perspective of one agent 114. However, as evident to those having ordinary skills in the art, the process of FIG. 5 is applicable to each agent 114 running on one server 110. Furthermore and in one example, agent 114 is a set of computer-readable instructions running on a processor of the corresponding server 110.

At S500, agent 114 periodically determines (collects) link connectivity information indicating blade server 110 to blade switch 108 connectivity. In one example, agent 114 determines this link connectivity information by inspecting (monitoring) LLDP/CDP frames between the corresponding blade server 110 and blade switch 108.

In one example, the periodicity according to which agent 114 collects link connectivity information is a configurable parameter determined by network/DC 100 operators, for example (e.g., every few seconds, minutes, hours, days, etc.).

At S510, agent 114 pushes (sends) the collected link connectivity information to a collector. In one example, the collector resides on DCNM 118. The collector makes the link connectivity information available to DCNM 118. In one example, instead of having the intermediate collector component present, agent 114 directly pushes the collected link connectivity information available to DCNM 118. Agent 114 can push the collected link connectivity information to the collector/DCNM 118 through any known or to be developed wired and/or wireless communication means.

In one example, instead of agents 114 periodically pushing link connectivity information to collector and ultimately to DCNM 118, DCNM 118 directly pulls (obtains by querying, for example) the link connectivity information from each of servers 110 thus eliminating the need for agents 114 and the collector residing on DCNM 118.

Figure 6:
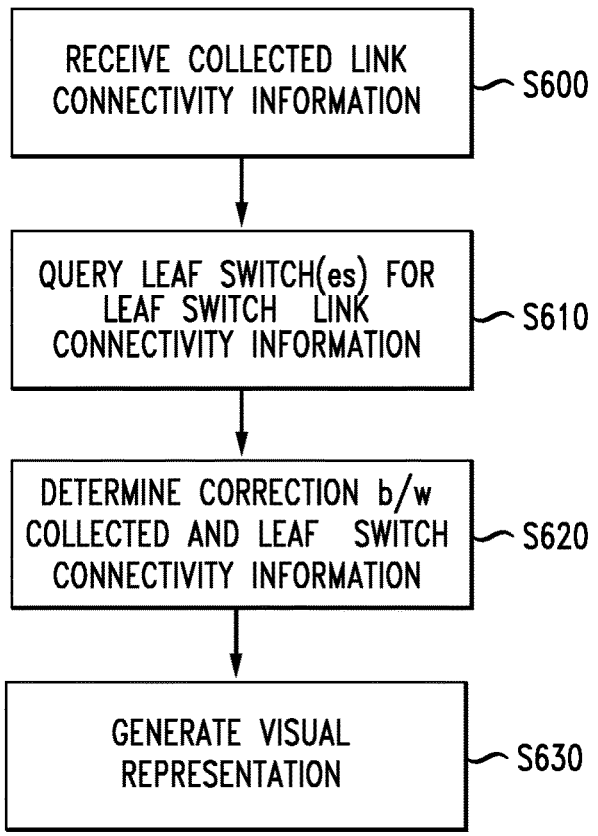
FIG. 6 illustrates a method according to an aspect of the present disclosure.

FIG. 6 illustrates a method, according to an aspect of the present disclosure. FIG. 6 will be described from the perspective of DCNM 118.

At S600, DCNM 118 (via a corresponding processor such as processor 255) receives collected link connectivity information from agent 114 (directly from agent 114 or from a collector associated with agent 14, as described above). DCNM 118 can receive the collected link connectivity information through any known or to be developed wired and/or wireless communication means.

At S610, DCNM 118 queries each of leaf switches 106 for corresponding leaf switches link connectivity information through any known or to be developed wired and/or wireless communication means (e.g., for LLDP/CDP neighboring information that indicate which blade switches (e.g., blade switch 108)).

At S620, using the collected link connectivity information received at S600, leaf switches link connectivity information received at S610 and information available to DCNM 118 that indicate which containers are running on which blade servers 110 (container workload information). DCNM 118 determines container to leaf switch connectivity information that indicate which containers are connected to which ones of leaf switches 106 (container to leaf switch connectivity information).

At S630 (similar to S440 described above), based on the determined container to leaf switch connectivity information at S620. DCNM 118 generates visual representation 120 of a topology of the DC 100, that also illustrates the container to leaf switch connectivity information between container workloads and their connectivity to each of leaf switches 106 thus providing a more complete and holistic view of DC 100 connectivity and operations.

As indicated above, DC 100 may be a hybrid network of blade servers and switches manufactured by Cisco Technology Inc., of San Jose, Calif. as well as one or more manufacturers other that Cisco Technology Inc. of San Jose, Calif. Accordingly, in such hybrid structure of DC 100, a combination of processes described with reference to FIGS. 3-6 can be performed, where for each blade server/switch manufactured by Cisco Technology Inc. of San Jose, Calif., processes of FIGS. 3 and 4 are implemented while for every blade server/switch manufactured by a manufacturer other than Cisco Technology Inc. of San Jose, Calif., processes of FIGS. 5 and 6 are implemented.

For clarity of explanation, in some instances the present technology may be presented as including individual functional blocks including functional blocks comprising devices, device components, steps or routines in a method embodied in software, or combinations of hardware and software.

In some examples the computer-readable storage devices, mediums, and memories can include a cable or wireless signal containing a bit stream and the However, when mentioned, non-transitory computer-readable storage media expressly exclude, media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

We claim:

1. A method of determining container to leaf switch connectivity information of a data center utilizing at least one blade switch and at least one blade server, the method comprising:
   receiving, at a network controller, link connectivity information that includes south-bound neighboring information between the at least one blade switch of the data center and the at least one blade server of the data center;
   determining, at the network controller, the container to leaf switch connectivity information of the data center, based on the link connectivity information; and
   generating a visual representation of a topology of the data center based on the container to leaf switch connectivity information.

2. The method of claim 1, further comprising:
   sending a query to a network component for the link connectivity information, the network component determining the link connectivity information.

3. The method of claim 2, wherein the link connectivity information further includes north-bound neighboring information between the at least one blade switch and at least one leaf switch of the data center.

4. The method of claim 3, wherein the determining the link connectivity information comprises:
   inspecting LLDP/CDP frames transmitted between the at least one blade switch and the at least one blade server to determine the south-bound neighboring information; and
   inspecting LLDP/CDP frames transmitted between the at least one blade switch and the at least one leaf switch to determine the north-bound neighboring information.

5. The method of claim 3,
   wherein:
   the determining the container to leaf switch connectivity information of the data center includes correlating the link connectivity information with container workload information available to the network controller, and
   the container workload information indicating which containers are running on which ones of the at least one blade server.

6. The method of claim 1, wherein the receiving periodically receives the link connectivity information from an agent deployed on the at least one blade server in the data center.

7. The method of claim 6, further comprising:
   querying at least one leaf switch for leaf switch link connectivity information, the leaf switch link connectivity information indicating north-bound neighboring information between the at least one blade switch and the at least one leaf switch.

8. The method of claim 7, wherein the determining includes correlating the link connectivity information, the leaf switch link connectivity information, and container workload information to determine the container to leaf switch connectivity information.

9. A data center comprising:
   at least one blade switch;
   at least one blade server; and
   at least one network controller configured to:
      receive link connectivity information that includes south-bound neighboring information between the at least one blade switch of the data center and the at least one blade server of the data center;

determine container to leaf switch connectivity information of the data center, based on the link connectivity information; and generate a visual representation of a topology of the data center based on the container to leaf switch connectivity information.

10. The data center of claim 9, further comprising:
a unified computing system (UCS) manager configured to manage the at least one blade server and the at least one blade switch and determine the link connectivity information, the network controller configured to send a query to the UCS manager for the link connectivity information.

11. The data center of claim 10, wherein the link connectivity information further includes north-bound neighboring information between the at least one blade switch and at least one leaf switch of the data center.

12. The data center of claim 11, wherein the UCS manager is configured to determine the link connectivity information by:
inspecting LLDP/CDP frames transmitted between the at least one blade switch and the at least one blade server to determine the south-bound neighboring information; and
inspecting LLDP/CDP frames transmitted between the at least one blade switch and the at least one leaf switch to determine the north-bound neighboring information.

13. The data center of claim 12,
wherein,
the network controller is configured to determine the container to leaf switch connectivity information of the data center by correlating the link connectivity information with container workload information available to the network controller,
the container workload information indicating which containers are running on the at least one blade server.

14. The data center of claim 9, wherein the network controller is configured to periodically receive the link connectivity information from an agent deployed on the at least one blade server in the data center.

15. The data center of claim 14,
wherein,
the network controller is further configured to query at least one leaf switch for leaf switch link connectivity information, and
the leaf switch link connectivity information indicating north-bound neighboring information between the at least one blade switch and the at least one leaf switch.

16. The data center of claim 15, wherein the network controller is configured to determine the container to leaf switch connectivity information by correlating the link connectivity information, the leaf switch link connectivity information, and container workload information to determine the container to leaf switch connectivity information.

17. A non-transitory computer-readable medium having computer-readable instructions stored therein, which when executed by a processor, causes the processor to determine container to leaf switch connectivity information of a data center utilizing at least one blade switch and at least one blade server by:
receiving, at a network controller, link connectivity information that includes south-bound neighboring information between the at least one blade switch of the data center and the at least one blade server of the data center;
determining, at the network controller, the container to leaf switch connectivity information of the data center, based on the link connectivity information; and
generating a visual representation of a topology of the data center based on the container to leaf switch connectivity information.

18. The non-transitory computer-readable medium of claim 17, wherein execution of the computer-readable instructions by the processor, further causes the processor to:
send a query to a network component for the link connectivity information, the network component determining the link connectivity information, the link connectivity information further including north-bound neighboring information between the at least one blade switch and at least one leaf switch of the data center; and
determine the container to leaf switch connectivity information of the data center by correlating the link connectivity information with container workload information indicating which containers are running on the at least one blade server.

19. The non-transitory computer-readable medium of claim 17, wherein execution of the computer-readable instructions by the processor, further causes the processor to periodically receive the link connectivity information from an agent deployed on the at least one blade server in the data center.

20. The non-transitory computer-readable medium of claim 19, wherein execution of the computer-readable instructions by the processor, further causes the processor to:
query at least one leaf switch for leaf switch link connectivity information, the leaf switch link connectivity information indicating north-bound neighboring information between the at least one blade switch and the at least one leaf switch; and
correlate the link connectivity information, the leaf switch link connectivity information and container workload information to determine the container to leaf switch connectivity information.

* * * * *